(12) United States Patent
Kramer et al.

(10) Patent No.: US 6,634,857 B2
(45) Date of Patent: Oct. 21, 2003

(54) MANUALLY GUIDED SUCTION DEVICE OR BLOWER

(75) Inventors: Jochen Kramer, Waiblingen (DE); Karl-Heinz Lange, Remshalden (DE)

(73) Assignee: Andreas Stihl AG & Co. (DE)

(*) Notice: Subject to any disclaimer, the term of this patent is extended or adjusted under 35 U.S.C. 154(b) by 361 days.

(21) Appl. No.: 09/827,694

(22) Filed: Apr. 6, 2001

(65) Prior Publication Data
US 2001/0028847 A1 Oct. 11, 2001

(30) Foreign Application Priority Data
Apr. 7, 2000 (DE) .................... 200 06 485 U

(51) Int. Cl.[7] ............................. F04D 29/40
(52) U.S. Cl. ..................... 415/214.1; 285/903
(58) Field of Search .............. 415/224.5, 214.1; 285/319, 253, 903

(56) References Cited
U.S. PATENT DOCUMENTS
4,922,583 A * 5/1990 Wentworth .................. 15/405
5,971,438 A * 10/1999 Johnson .................. 285/12

FOREIGN PATENT DOCUMENTS
DE 198 33 837 A1 2/2000

* cited by examiner

Primary Examiner—Edward K. Look
Assistant Examiner—Kimya N McCoy
(74) Attorney, Agent, or Firm—R W Becker & Associates; R W Becker

(57) ABSTRACT

A manually guided suction device or blower is provided that has a housing in which is formed a spiral blower path in which is disposed an impeller that is rotatably driven by a drive motor. The spiral blower path has an air-conveying air inlet and an air-withdrawing outlet. A connector is provided for the detachable connection of an air-conveying connection conduit, whereby when the connection conduit is mounted it overlaps with the connector, which is secured to the housing, over a prescribed axial length. To achieve a mechanically secure connection, an annular sealing element is held in a groove in a surface of the connector or connection conduit in the overlap region, wherein over the entire circumference thereof, the sealing element projects beyond such surface.

8 Claims, 2 Drawing Sheets

MANUALLY GUIDED SUCTION DEVICE OR BLOWER

BACKGROUND OF THE INVENTION

The present invention relates to a manually guided suction device or blower having a housing in which is formed a spiral blower path in which is disposed an impeller that is rotatably driven by a drive motor. The housing has an air inlet for conveying air to the spiral blower path, and an air outlet for withdrawal of air therefrom. A connector is secured to the housing and is embodied for the detachable connection of an air-conveying connection conduit, whereby when the connection conduit is mounted it overlaps with the connector over a prescribed axial length.

DE 198 33 837 A1 discloses a portable suction device or blower having a housing in which is formed a spiral blower path in which is accommodated an impeller that is rotatably driven by a drive motor. When the motor is running, air is supplied to the spiral blower path via an air inlet, and air is withdrawn from the spiral blower path via the air outlet. An air-conveying connection conduit can be mounted in a connector that is secured to the housing at the air outlet. When the connection conduit is mounted, it and the fixed connector overlap one another over a prescribed axial length. In this overlap region a mechanical connection, in particular a bayonet joint, is provided that is formed from guide ways or tracks that are provided in the outer surface of the connector, as well as from radial cams or projections that are provided on the connection conduit. A cam is positively secured in the peripheral portion of a guide way by means of a snap connection. The connection conduit is axially fixed in position, and is secured against rotation, by the bayonet joint.

In order to be able to easily assemble and disassemble the bayonet joint, an appropriate assembly gap, in other words a radial play, must be provided in the overlap region. In this connection, the non-rotatable connection is established exclusively via the detent or latch that secures the connection conduit in the end position. The bayonet joint has proven to be satisfactory as a connection that can absorb high forces; however, as the operating time increases, a high degree of wear of the snap connection that secures the bayonet closure in the end position was discovered. The cause for this is that not only during suction operation but also during blowing operation the free end of the suction or blower conduit comes into contact with the ground, as a result of which, due to the long lever, considerable forces become effective in the connection region. Over time, this leads to an undesirable loosening of the bayonet joint, and can adversely affect the operation of the suction device or blower.

It is therefore an object of the present invention to improve a suction device or blower of the aforementioned general type in such a way that a mechanically secure connection of the connection conduit is ensured over a long period of operation.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The suction device or blower of the present invention is characterized primarily in that in the overlap region, an annular sealing element is held in a groove of a surface of the connector or connection conduit, wherein over the entire circumference thereof the sealing element projects beyond the surface in which the groove is provided.

A structurally prescribed frictional engagement is effected between the connector and the connection conduit due to the annular sealing element that is disposed in the overlap region of the connector and the connection conduit, and advantageously in the outer surface of the connection conduit. Due to the frictional engagement, the forces that are introduced from the connection conduit into the bayonet joint, i.e. into the snap connection thereof, are at least partially absorbed, so that the forces that act upon the snap connection are minimized. With the construction otherwise being the same, the snap connection has a longer useful life.

The sealing element is advantageously formed as a flat ring made of elastomeric material, whereby the side walls of the groove in the outer surface of the connection conduit project beyond the edges of the end faces of the flat ring.

It can be expedient to provide the base of the groove in the outer surface of the connection conduit with a convex configuration. A flat ring having a constant thickness bulges from the end faces of a groove embodied in this manner and, in its central portion, over the circumference of the connection conduit, projects beyond the outer surface thereof. When the connection conduit is introduced into the connector, there then results a frictional engagement between the sealing element and the connector. The axial position of the groove and of the sealing element on the outer surface of the connection conduit is expediently selected in such a way that when viewed in the direction of assembly of the connection conduit, the groove and sealing element are disposed upstream of the mechanical connection. In the overlap region between the connector and the connection conduit, it can be expedient to dispose a support sleeve on the inner side of the connection conduit. The thickness of the support sleeve is advantageously such that the support sleeve is approximately aligned with the base of the groove on the inner side of the connection conduit.

Further specific features of the present invention will be described in detail subsequently.

DESCRIPTION OF PREFERRED EMBODIMENTS

Figure 1:
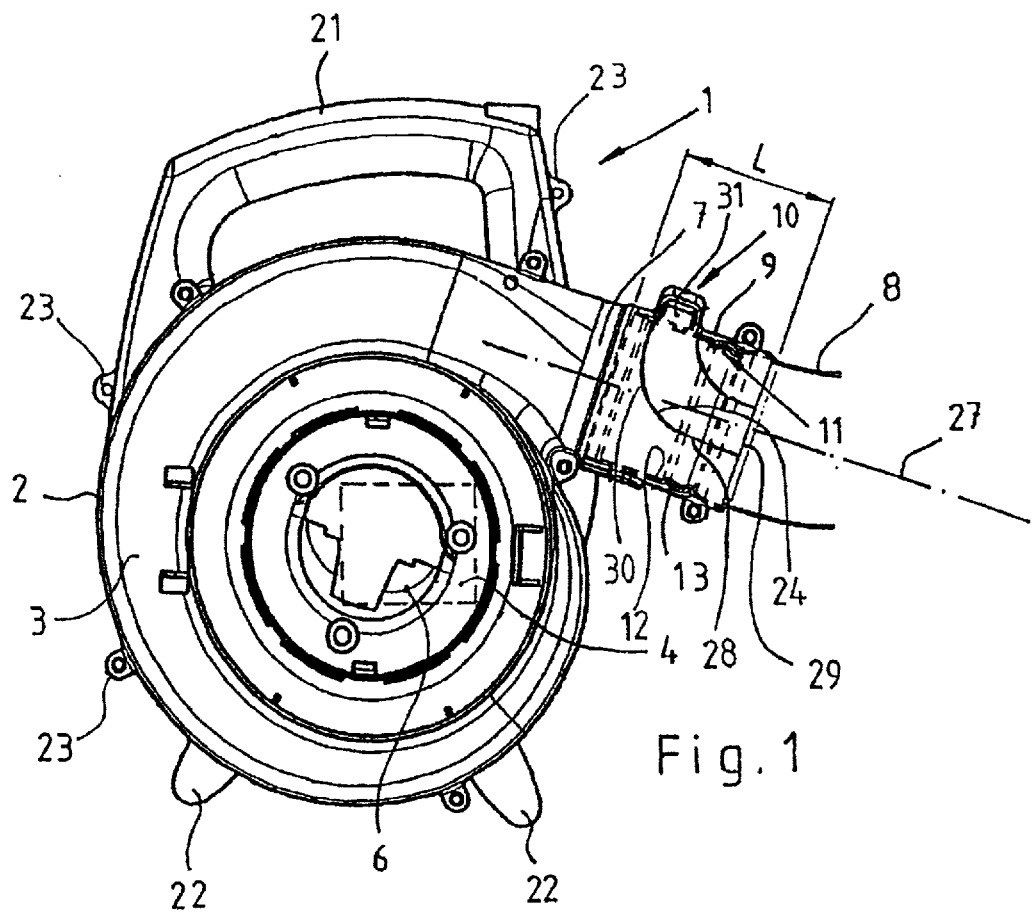
FIG. 1 is a side view of one exemplary embodiment of an inventive suction device or blower having a connection conduit mounted on the connector of the air outlet.

Referring now to the drawings in detail, the suction device or blower 1 illustrated in FIG. 1 is provided with a spiral blower path 3 that is formed in a housing 2. A non-illustrated impeller is rotatably driven in the spiral blower path 3 by a drive motor 4 that is disposed in the housing 2. Also formed in the housing 2 is an air inlet 6 for guiding air to the spiral blower path 3; the air inlet 6 is disposed axially relative to the spiral blower path. Also provided is an air outlet 7 for the withdrawal of air from the spiral blower path 3; the air outlet 7 adjoins the spiral blower path 3 approximately tangentially. Formed at the air outlet 7 is a connector 9 that is fixedly disposed on the housing 2 and in which is inserted a connection conduit 8.

The housing 2 of the suction device or blower 1 is provided with an upper handle 21 that in the longitudinal direction extends in a plane that is parallel to the connector 9. The base region of the housing 2 is provided with feet 22 to allow the suction device or blower 1 to be placed on the ground or floor. The housing 2 is composed of two partial sections that are joined together via bolts by means of connection domes or fittings 23 that are disposed on the rims of the partial sections.

The connection conduit 8 is secured in the connector 9 by means of a mechanical connection 10, in the illustrated embodiment a bayonet joint, located in the overlap region L. The guide ways or tracks 24 of the bayonet joint, one of which is indicated, are formed as channels in the wall of the connector 9 and have a U-shaped cross-sectional configuration. The open side of the channels faces the interior of the connector 9. Guided in the tracks 24 are a cam or projection having a rectangular configuration, and a cam or projection having a parabolic configuration; these projections 25, 26 are disposed on the outer surface 12 of the connection conduit 8 (see FIG. 2).

Each track 24 comprises a first axial portion 28 that extends approximately parallel to the longitudinal central axis 27 of the connector 9 and has an open end at the end 29 of the connector 9. The axial portion 28 merges into a circumferential portion 30 that is disposed substantially perpendicular to the longitudinal central axis 27, and the end 31 of which in the circumferential direction is disposed at approximately 90° relative to the open end of the axial portion 28. Disposed at the end 31 of the circumferential portion 30 is a non-illustrated snap connection for the positive yet detachable connection of the rectangular projection 26 to the connector 9. To relieve the load of this snap connection, it is inventively proposed to provide a structural frictional engagement over the periphery of the connector 9 in the overlap region of the connector and the connection conduit 8. For this purpose, an annular sealing element 13 is placed in a groove 11 in the outer surface 12 of the connection conduit 8. The sealing element 13 projects beyond the outer surface 12 of the connection conduit 8 over the entire periphery thereof.

Figure 2:
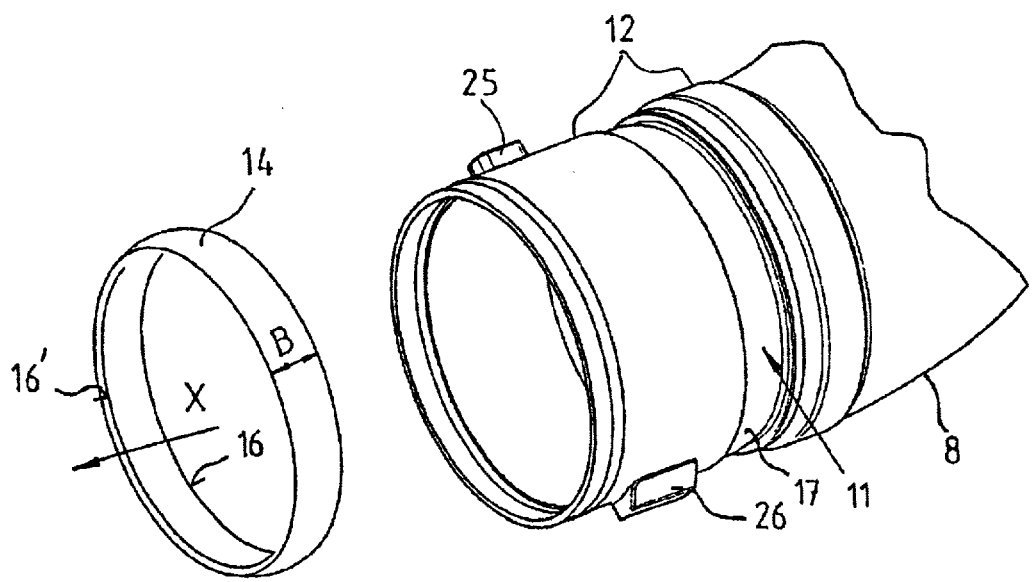
FIG. 2 is a perspective view of the overlap region of a connection conduit.

FIG. 2 is a perspective view of the overlap region of the connection conduit 8. The sealing element 13 is formed by a flat ring 14 that is made of elastomeric material and that is placed into the groove 11 by being slipped over the connection conduit 8. When viewed in the direction of assembly X of the connection conduit 8, the groove 11 is disposed upstream of the projections 25, 26 of the connection 10 (see FIG. 1), and has an approximately rectangular cross-sectional configuration. The base 17 of the groove 11 is convexly curved relative to the outer surface 12 of the connection conduit 8 (see FIG. 3). The flat ring 14 has the same thickness over its width B. In the mounted state of the flat ring 14, the end faces 16, 16' thereof are covered by the side walls 15, 15' of the groove 11; these side or groove walls 15, 15' are expediently higher and extend beyond the edges of the end faces 16, 16'.

Figure 3:
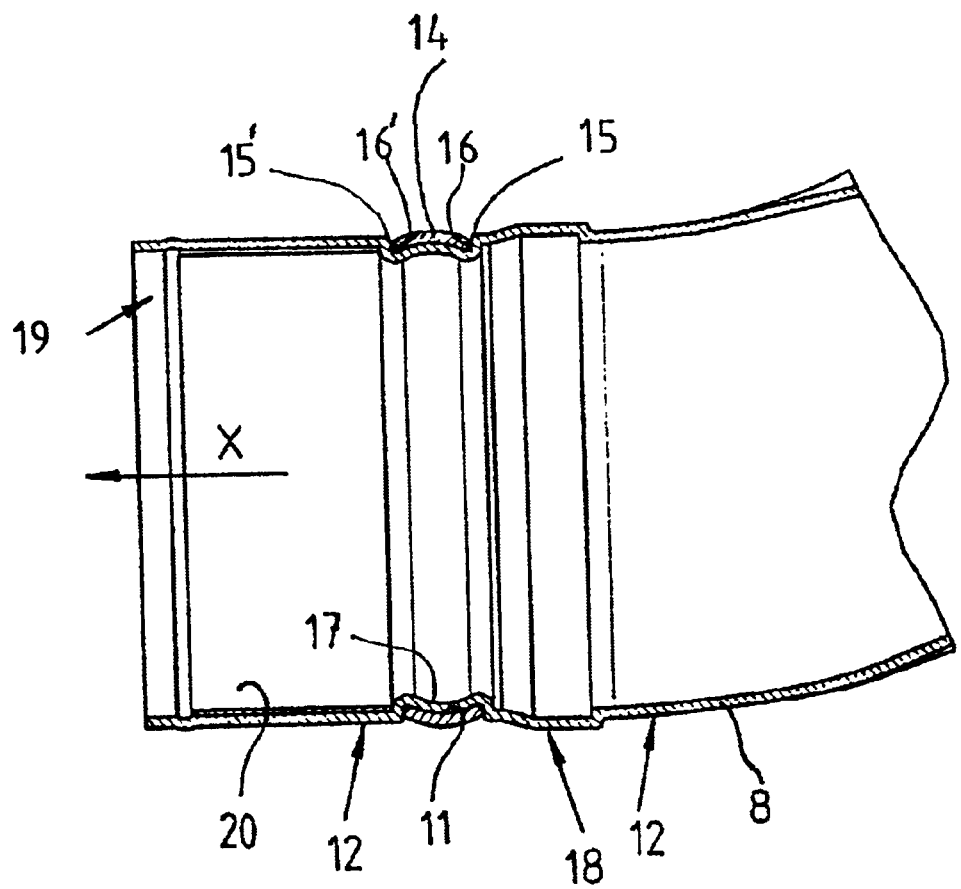
FIG. 3 is a longitudinal cross-sectional view through the connection conduit of FIG. 2.

FIG. 3 is longitudinal cross-sectional view through the connection conduit 8 and shows the flat ring 14 placed into the groove 11. The groove base 17 is convexly curved toward the outer surface 12 of the connection conduit 8. Due to these structural features, there results a bulging of the flat ring 14 toward the middle of the groove. As a result, in the direction of assembly X the flat ring 14 can be brought centrally over its periphery to rest against the inner wall of the connector 9. Due to the fact that the side walls 15, 15' of the groove 11 project beyond the end faces 16, 16' of the flat ring 14, during assembly or mounting of the connection conduit 8 an incorrect insertion of the flat ring 14 into the connector 9 is prevented. An axial abutment of the connection conduit 8 against the connector 9 is formed by a radially expanded tubular section 18 that projects from the outer surface 12 of the connection conduit 8.

To reinforce or strengthen the overlap region between the connector 9 and the connection conduit 8, which is made of polymeric material, it is expedient to dispose a support sleeve 20 on the inner side 19 of the connection conduit 8. The support sleeve 20 is preferably made of steel, and is inserted axially until it comes to rest against the side wall 15' of the groove 11. It can also be advantageous to inject the support sleeve 20.

The specification incorporates by reference the disclosure of German priority document 200 06 485.1 of Apr. 7, 2000.

The present invention is, of course, in no way restricted to the specific disclosure of the specification and drawings, but also encompasses any modifications within the scope of the appended claims.

What we claim is:

1. A manually guided suction device or blower comprising:

a housing in which is formed a spiral blower path in which is disposed an impeller that is rotatably driven by a drive motor, wherein said housing has an air inlet for conveying air to said spiral blower path, and an air outlet for withdrawal of air from said spiral blower path;

a connector secured to said housing at said air outlet;

a connection conduit for conveying air, wherein said connection conduit is detectably connectable to said connector such that they overlap one another over a prescribed axial length that forms an overlap region, wherein in said overlap region one of said connection conduit and said connector is provided with a groove in a surface thereof; and an annular sealing element disposed in said groove wherein over an entire circumference thereof said sealing element projects beyond said surface in which said groove is provided.

2. A suction device or blower according to claim 1, wherein said sealing element is disposed in an outer surface of one of said connection conduit and said connector.

3. A suction device or blower according to claim 2, wherein said connection conduit is insertable into said connector, and wherein said sealing element establishes a frictional engagement between said connector and said connection conduit.

4. A suction device or blower according to claim 1, wherein said sealing element is a flat ring made of elastomeric material, and wherein side walls of said groove extend beyond edges of end faces of said flat ring.

5. A suction device or blower according to claim 4, wherein said groove has a convexly curved base.

6. A suction device or blower according to claim 1, wherein in a direction of assembly of said connection conduit, said sealing element is disposed upstream of a mechanical connection between said connection conduit and said connector.

7. A suction device or blower according to claim 1, wherein in a direction of assembly, a radially expanded tubular section is disposed upstream of said sealing element.

8. A suction device or blower according to claim 1, wherein in said overlap region, a support sleeve is provided on an inner side of said connection conduit.

* * * * *